US00RE33995E

United States Patent [19]

Schlaikjer

[11] E Patent Number: Re. 33,995

[45] Reissued Date of Patent: Jul. 14, 1992

[54] LITHIUM/SULFUR DIOXIDE CELL

[75] Inventor: Carl R. Schlaikjer, Concord, Mass.

[73] Assignee: Battery Engineering Inc., Hyde, Pa.

[21] Appl. No.: 611,406

[22] Filed: Nov. 9, 1990

Related U.S. Patent Documents

Reissue of:

[64] Patent No.: 4,925,753
Issued: May 15, 1990
Appl. No.: 250,109
Filed: Sep. 28, 1988

[51] Int. Cl.[5] ..... H01M 6/14; H01M 4/36

[52] U.S. Cl. ..... 429/196; 429/101; 429/105

[58] Field of Search ..... 429/101, 105, 196

[56] References Cited

U.S. PATENT DOCUMENTS 4,177,329 12/1979 Dey et al. ..... 429/196 X
4,318,969 3/1982 Peled et al. ..... 429/196 X
4,482,616 11/1984 Connolly et al. ..... 429/101
4,513,067 4/1985 Kuo et al. ..... 429/101

FOREIGN PATENT DOCUMENTS 2124821 2/1984 United Kingdom ..... 429/196

*Primary Examiner*—Stephen Kalafut
*Attorney, Agent, or Firm*—Allan Redrow

[57] ABSTRACT

The lithium/carbon/$SO_2$ energy cell is disclosed wherein the electrolyte includes lithium tetrachloroaluminate. In order to increase the electrical capacity of the cell, the concentration of lithium tetrachloroaluminate in the electrolyte is increased [to] *and* calcium tetrachloroaluminate [and] *is* added to the solution to aid the mass transport as well as [the] *to* lower *the* freezing point of the electrolyte. In order to eliminate any corrosive effect of the calcium [added] *additive* to on the lithium anode, this disclosure provides a teaching of the use of an electrolyte solution [and] *that* is essentially free of any [moist] *moisture* content.

6 Claims, 2 Drawing Sheets

LITHIUM/SULFUR DIOXIDE CELL

Matter enclosed in heavy brackets [ ] appears in the original patent but forms no part of this reissue specification; matter printed in italics indicates the additions made by reissue.

*This application is a Reissue of Ser. No. 250,109, filed Sep. 28, 1988, U.S. Pat. No. 4,925,753.*

This invention relates to a lithium/carbon rechargeable cell having a sulfur dioxide lithium-calcium tetrachloroaluminate electrolyte solution.

BACKGROUND

Lithium primary and secondary cells having electrolytes formed of solvates of the tetrachloroaluminates of alkali and alkaline earth metals dissolved in sulfur dioxide are well known in the electrochemical power source art. Typical examples of variations of such cells are described in the following prior art teachings:

A known battery of this type is shown in the U.S. Pat. No. 4,513,067 to Kuo et al issued Apr. 23, 1985. This patent covers a battery with an alkali or alkaline earth anode, a carbon cathode, and a sulfur dioxide electrolyte. A basic battery including lithium tetrachloroaluminate dissolved in sulfur dioxide is described in Example No. 1 of this Kuo patent.

The Kuo patent is concerned with the construction of a battery wherein the cathode is made of porous carbon that may have an admixture therein, the admixture being a solid cathode active material that is substantially insoluble in the sulfur dioxide electrolyte and wherein the electrolyte salt used interacts with the sulfur dioxide solvent to minimize the reaction of the sulfur dioxide with the anode whereby to inhibit the formation of anode metal dithionite at the cathode surface.

Another U.S. Pat. No. 4,482,616 to Connolly et al issued on Nov. 13, 1984 is another example of a disclosure of a battery of this general type wherein the solubility of a lithium salt in the sulfur dioxide solvent system is said to be enhanced by the addition of a salt which contains a cation selected from the group of metal cation complexes consisting of ammonium cations and phosponium cations.

A discussion of an electrolyte including lithium tetrachloroaluminate and sulfur dioxide in combination with other alkali and alkaline earth tetrachloroaluminates in such batteries was published at the fall meeting of the Electrochemical Society in 1986 and was reported in Abstract #13 page 19 of the transactions covering that assembly.

A review of this prior art shows that while alkali and alkaline earth tetrachloroaluminates have been described as having been combined in different combinations to be dissolved in sulfur dioxide to form electrolytes in either primary or secondary batteries, no practical electrolyte has been suggested that includes a calcium tetrachloroaluminate used in combination with lithium tetrachloroaluminate dissolved in sulphur dioxide. In particular, the study covered in said Abstract #13 makes of record the fact that the "corrosion rate of lithium in the electrolyte containing $Ca(AlCl_4)_2$ was found to be high", see Abstract #13 page 19 col. 2, lines 41–43.

Also in FIG. 6, that is referred to in the Abstract, the data showed that a very rapid rate of lithium corrosion in the first 14 days of storage with the $Ca(AlCl_4)_2$ at 71°

C. occurred, as compared with various other electrolyte solutions in sulfur dioxide. Thus the art teaches away from the use of any amount of calcium tetrachloroaluminate in the electrolyte in a lithium/carbon type of battery.

There is no discussion in the Abstract #13 concerning the reason for the corrosion problem, the observation being made, only of the existence of the actual corrosion having taken place. The Abstract is devoid of any mention of a possible cause nor does it suggest a cure for this particular corrosion problem.

BRIEF DISCUSSION OF THIS INVENTION

It is well known, that in a lithium anode and a porous carbon cathode cell filled with lithium tetrachloroaluminate dissolved in sulfur dioxide, in a molar ratio of 1 to 6, that during discharge of the cell, the aluminum as well as the sulfur dioxide enters into the reaction to produce a reaction product that adheres strongly to the carbon cathode and leaves the electrolyte with a lower concentration of aluminum. (For a discussion of the chemistry of this system see the paper presented by A. N. Dey, H. C. Kuo, D. Foster, C. Schlaikjer, and M. Kallianidis at the Power Sources Symposium, May, 1986, at Cherry Hill, N.J., reported at the 32nd Power Sources Symposium). It is stated in U.S. Pat. No. 4,518,067, example 3, that if the aluminum concentration can be increased, the realized capacity of the battery can be markedly improved. However, the use of a larger concentration of lithium tetrachloroaluminate in the sulfur dioxide to increase the electrical capacity would raise the freezing point of the electrolyte to an unacceptably high level.

It is therefore proposed herein to add aluminum to the electrolyte by providing an electrolyte that includes lithium tetrachloroaluminate and an antifreeze and in particular this invention includes a mixture of lithium tetrachloroaluminate and calcium tetrachloroaluminate. It is to be noted that in this combination the use of the calcium admixture not only lowers the freezing point of the electrolyte but it also serves to aid mass transport and decrease electrode polarization. When such a mixed electrolyte is used, the cell will be found to have a higher capacity and a lower fading characteristic with the number of cycles of charging and discharging. The calcium in solution is not reduced to calcium metal by the lithium anode, since the lithium is coated with a film of lithium chloride and cannot react to any significant degree with other species dissolved in the electrolyte.

IN THE DRAWINGS

FIG. 1 shows the profiles of an AA cell with a Pyrex separator and containing $LiAlCl_4/Ca(AlCl_4)_2/SO_2$ in a molar relation of 1 to 12 during its first two charge and discharge cycles; and FIG. 2 shows the profiles of the same battery for the 19, 20, and 21st cycles.

DETAILED DESCRIPTION

Figure 1:
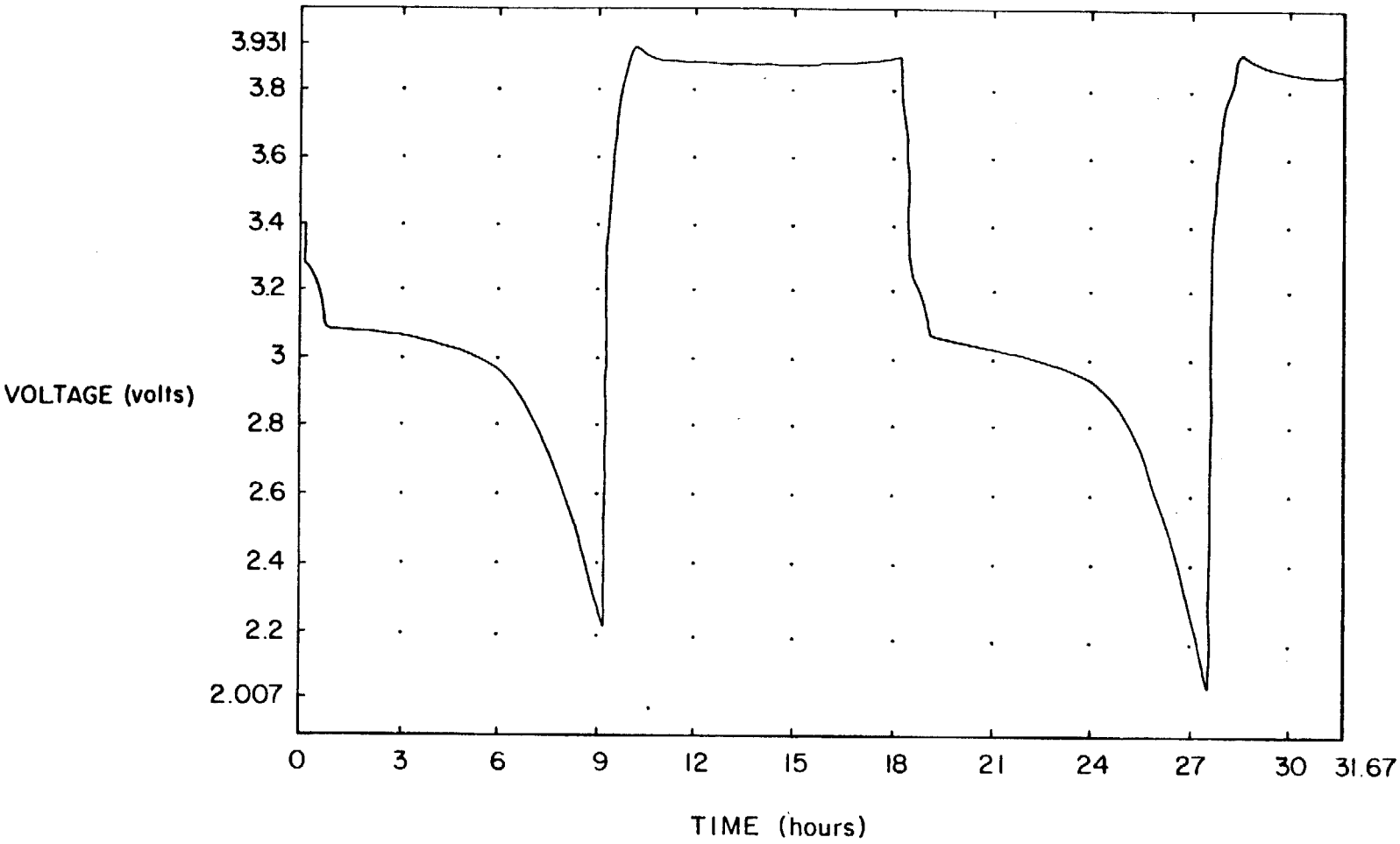

The discovery forming the basis of this invention is concerned with the ability to use a mixture of lithium tetrachloroaluminate and calcium tetrachloroaluminate dissolved in sulfur dioxide to form an electrolyte that may be used in a lithium/carbon cell without encountering the objectionable corrosive effect that has heretofore prevented the use of this mixed salt combination in such a cell. The addition of the calcium tetrachloroaluminate to the sulfur dioxide solvent with the lithium tetrachloroaluminate to lower the melting point of the solution also accomplishes the desired addition of aluminum to the reaction that proceeds within the cell without producing [anY] *any* harmful effect and improves the capacity of the cell and lowers the fading characteristic as the cycling progresses.

The ability to use the mixture of lithium/calcium tetrachloroaluminates in the sulfur dioxide solvent without encountering any harmful corrosive effect, resides in the knowledge that, in so far as it is possible, it is necessary to exclude the presence of moisture from the electrolyte. When the cell is being assembled, a substantially moisture free mixture of lithium/calcium tetrachloroaluminate is dissolved in reagent grade sulfur dioxide, wherein the calcium tetrachloroaluminate is used to lower the melting point of the solution and to add aluminum to the electrolyte. The addition of the calcium salt also has also been found to aid the mass transport in the reaction and decrease electrode polarization. The lithium anode is protected from direct reaction with the solvent and calcium component of the electrolyte by an insoluble thin film of lithium chloride salt which is formed thereon when the electrolyte is poured in the cell, which film allows passage of lithium ions, and therefore electrochemical discharging, and charging or plating of lithium. Such films are believed to be common in cells and batteries with lithium negative electrodes, as explained for example by E. Peled in "Lithium Batteries" (J. P. Gabano, ed., Acedemic Press, London, 1983), and are identified as "solid electrolyte interphases."

The lithium electrode in a $LiAlCl_4$-$3SO_2$ electrolyte held at 70° F. for 3 weeks was found to be coated by crystalline lithium chloride but no aluminum was found either in the salt film or in the lithium metal under the film (Schlaikjer et al, Electrchemical Society Fall Meeting, 1986, Abstract #7). It is likely that the calcium ion in solution in the electrolyte of the current invention is likewise forced to remain in the solution by the lithium chloride salt film on the lithium surface, and does not plate out on the lithium anode as a metallic film of calcium. The presence of moisture in this instance would be detrimental because it would cause corrosion of the cell components, particularly of the lithium negative electrode. For this reason, the concentration of moisture and of hydrolysis products must be kept as low as possible. Moisture can be inadvertently introduced into the cell through the component salts, lithium chloride, calcium chloride, or aluminum chloride, or it may be also present in the sulfur dioxide.

State of the art electrolytes containing aluminum chloride and alkali chloride, with or without alkaline earth chlorides, and sulfur dioxide, are made by mixing the salts together in a vented container and exposing the mixture to a large excess of sulfur dioxide gas by bubbling it through the mixture. Most of the moisture present in the sulfur dioxide gas is absorbed by the highly hygroscopic salt mixture, even if the initial concentration of moisture in the sulfur dioxide gas is low.

In the present invention, the moisture content of such mixtures is minimized first by heating the alkali chloride, in this case lithium chloride and the alkaline earth chloride, in this case calcium chloride in vacuo to at least 200° C. for at least 16 hours, following by cooling and storage while protected from the atmosphere. The aluminum chloride is purified by distillation at atmospheric pressure from molten lithium tetrachloroaluminate, in the presence of calcium turnings. The sulfur dioxide is added to the purified salts in an air tight container. To minimize the moisture introduced by the sulfur dioxide, the amount of this material added is only that which is sufficient to produce the required molar ratio of aluminum to sulfur. The essentially moisture free electrolyte including the lithium tetrachloroaluminate, calcium tetrachloroaluminate, and sulfur dioxide must then be filled into a moisture free cell that contains the lithium anode and carbon cathode wound in a spiral in the conventional manner and separated one from the other with nonwoven Pyrex fabric separators, while minimizing exposure of the electrolyte solution to the atmosphere. As soon as the cell is filled it is essential that it be sealed with the usual welded on cap while the assembly is held in a moisture free environment.

One example of a preferred cell made in accordance with this teaching is an AA size battery that includes a stainless steel case ½" in diameter by 1⅞" having a volume of 6.03 cubic centimeters. The steel case and its cover are adapted to be welded together after the known form of wound lithium anode and carbon cathode assembly have been placed in the case, it being essential that such assembly be accomplished in a manner to minimize the exposure of any of the parts to moisture either when outside or inside the case.

The pure lithium anode that measures 3"×1.5"×0.024" is supported in the known manner by being tab welded to the case and the porous carbon cathode that measures 3"×1.5"×0.016" and is made of Ketjenblack carbon with a 3% Teflon binder which is carried on a nickel screen that is connected to the positive terminal of the battery. Crane glass non-woven Pyrex fabric separators 0.005" to 0.007" thick were wound between the anode and cathode as the core of the battery was being assembled prior to its insertion in the case. The substantially moisture free electrolyte including the lithium/calcium tetrachloroaluminates dissolved in sulfur dioxide was filled into the moisture free and sealed assembly through the usual glass/metal compression seal in the cover without any exposure to the atmosphere.

In this preferred form of the AA battery, the lithium/calcium tetrachloroaluminates were dissolved in the solvent in the molar ratio of 2 to 1 to 12, that is the $LiAlCl_4$ to $Ca(AlCl_4)_2$ to $SO_2$.

Figure 2:
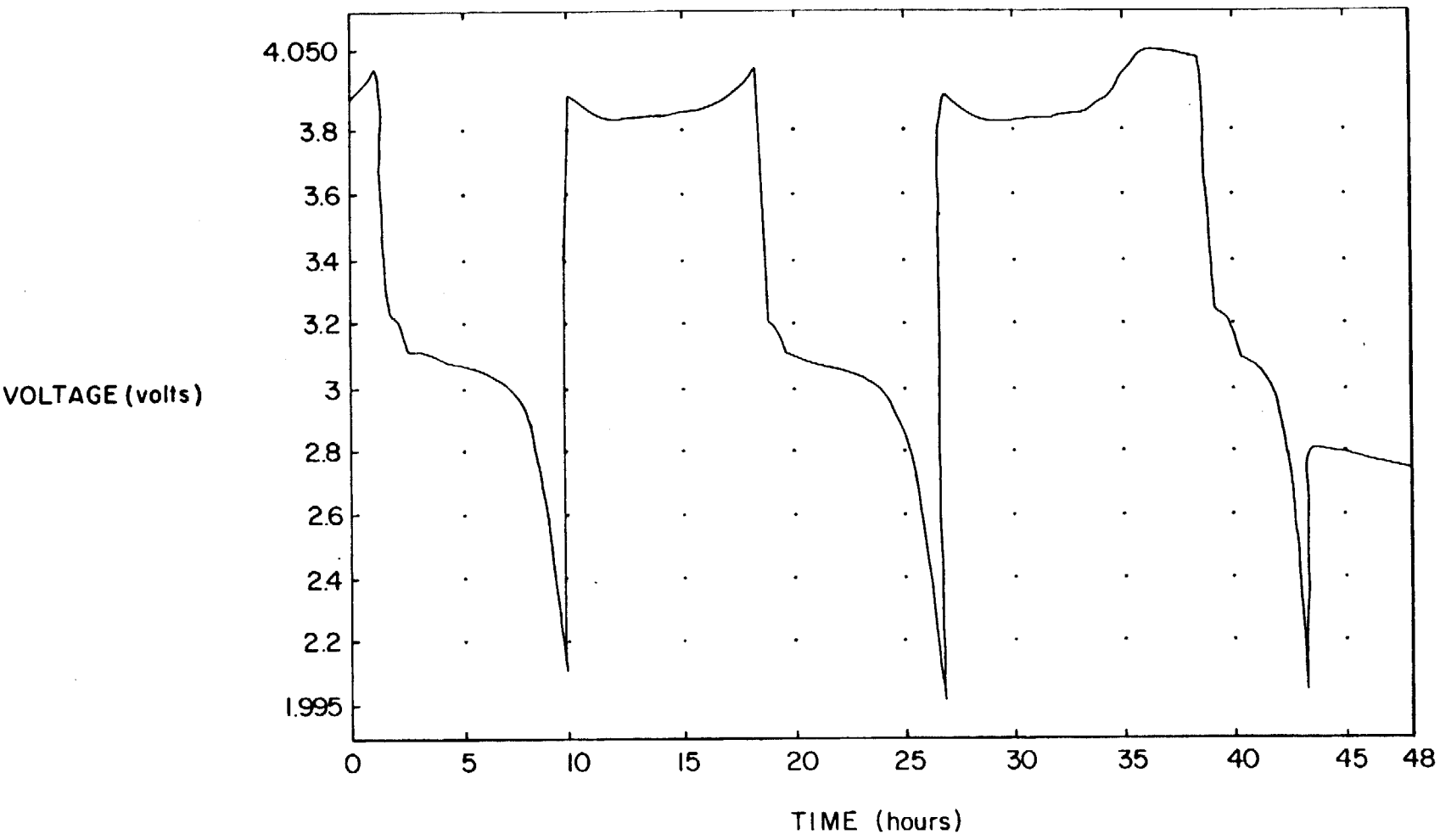

The battery made as above described was tested with discharge/charge time limits of 20 hrs/20 hrs discharge/charge potential limits of 2 V/4 V(100% depth of discharge); discharge/charge constant current of 50 mA, for a maximum total of 1 ampere hour, at operating temperatures within a range of from 19° C. to 31° C. FIG. 1 shows the start-up profiles of the potential versus time for the cell and FIG. 2 shows the profiles for cycles 19, 20, and 21.

The electrolyte composition may be varied from that described above for use in the preferred cell. The molar ratio of lithium tetrachloroaluminate to calcium tetrachloroaluminate and to sulfur dioxide may be varied within a range of lithium/calcium/sulfur dioxide of from 1/1/9 to 2/1/12. Other alkaline earth tetrachloroaluminates may be present singly or mixed in any combination, it being required only that a substantially moisture free solution be placed in a dry cell to realize the desired results of this invention.

While the above sets forth the preferred form of this invention, it is possible that modifications thereof may occur to those skilled in the art that will fall within the scope of the following claims:

I claim:

1. A substantially moisture free electrochemical cell comprising a lithium anode, an inorganic electrolyte including sulfur dioxide that provides a solvent for lithium tetrachloroaluminate and at least one alkaline earth tetrachloroaluminate and that functions in conjunction with dissolved aluminum and lithium to produce a discharge product and in which solution there is a mole equivalent ratio of lithium to alkaline earth to sulfur dioxide within the range of from 1 to 1 to 9, to [lb 2] *2 to 1* to 12, said cell having a cathode supported on a current collector, and said cathode consisting of a porous carbon for supporting the discharge product.

2. A substantially moisture free electrochemical cell as in claim 1 wherein said at least one tetrachloroaluminate is calcium tetrachloroaluminate.

3. A substantially moisture free electrochemical cell as in claim 2 wherein said lithium tetrachloroaluminate, said calcium tetrachloroaluminate, and said sulfur dioxide are present in a mole equivalent ratio of 2 to 1 to 12.

4. A substantially moisture free electrochemical cell as in claim 1 wherein said at least one tetrachloroaluminate is magnesium tetrachloroaluminate.

5. A substantially moisture free electrochemical cell as in claim 1 wherein said at least one tetrachloroaluminate is strontium tetrachloroaluminate.

6. A substantially moisture free electrochemical cell as in claim 1 wherein said at least one tetrachloroaluminate is barium tetrachloroaluminate.

* * * * *